United States Patent
Allen et al.

(10) Patent No.: US 9,791,942 B2
(45) Date of Patent: Oct. 17, 2017

(54) DYNAMIC COLLABORATIVE ADJUSTABLE KEYBOARD

(71) Applicant: International Business Machines Corporation, Armonk, NY (US)

(72) Inventors: Corville O. Allen, Morrisville, NC (US); Richard G. Bowers, Raleigh, NC (US); Lisa M. Bradley, Cary, NC (US); Henri F. Meli, Cary, NC (US); Gerald G. Tomkins, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 143 days.

(21) Appl. No.: 14/675,736

(22) Filed: Mar. 31, 2015

(65) Prior Publication Data
US 2016/0291701 A1  Oct. 6, 2016

(51) Int. Cl.
G06F 3/02 (2006.01)
G06F 3/023 (2006.01)
G06F 3/0488 (2013.01)

(52) U.S. Cl.
CPC .......... *G06F 3/0219* (2013.01); *G06F 3/0238* (2013.01); *G06F 3/04886* (2013.01)

(58) Field of Classification Search
CPC .... G06F 1/1624; G06F 1/1662; G06F 1/3271; G06F 3/02; G06F 3/0238
USPC ........................................................ 345/168
See application file for complete search history.

(56) References Cited

U.S. PATENT DOCUMENTS

| 8,402,097 B2 | 3/2013 | Szeto |
| 8,826,129 B2 | 9/2014 | Deluca et al. |
| 2010/0115448 A1 | 5/2010 | Lysytskyy et al. |

(Continued)

FOREIGN PATENT DOCUMENTS

| EP | 2558922 A1 | 2/2013 |
| WO | 2011130594 A1 | 10/2011 |
| WO | 2013024317 A1 | 2/2013 |

OTHER PUBLICATIONS

U.S. Appl. No. 62/049,832, Zhao; Shibao, filed Sep. 12, 2014.*
"Text Programming Guide for iOS", Apple, Inc., Mar. 10, 2014, pp. 38-48.

*Primary Examiner* — Seokyun Moon
*Assistant Examiner* — Peijie Shen
(74) *Attorney, Agent, or Firm* — Yee & Associates, P.C.; Nicholas Bowman

(57) ABSTRACT

In dynamically adjusting a keyboard mapping, a collaborative session in which a participant device is involved is detected. A conversation between participants during the collaborative session is captured, and topics being discussed during the conversation are identified using textual analysis. The topics are compared with a plurality of rules, each of which associates a topic with a keyboard mapping. From the rule that has a topic matching the identified topics, the keyboard mapping associated with the topic is obtained. The keyboard is then displayed using the keyboard mapping on the participant device. In determining the rule with the matching topic, a history of rules applied in prior collaborative session where the same or similar topics were discussed, or a profile of a participant, is considered. In this manner, keyboard mappings are dynamically adjusted, allowing for easier access to relevant keys.

17 Claims, 3 Drawing Sheets

(56) References Cited

U.S. PATENT DOCUMENTS

| | | | | |
|---|---|---|---|---|
| 2012/0256841 A1* | 10/2012 | Zhao | .................... | G06F 3/0216 345/168 |
| 2012/0304124 A1 | 11/2012 | Chen et al. | | |
| 2013/0268879 A1* | 10/2013 | Zhang | ................... | G06F 3/0418 715/773 |
| 2013/0305178 A1* | 11/2013 | Matsuzawa | ........... | G06F 3/0237 715/773 |
| 2014/0035823 A1* | 2/2014 | Khoe | ....................... | G06F 3/02 345/171 |
| 2014/0282240 A1 | 9/2014 | Flynn | | |
| 2016/0080296 A1* | 3/2016 | Lewis | ................... | H04L 51/08 715/752 |
| 2016/0170971 A1* | 6/2016 | McSherry | ............ | G06F 17/277 704/9 |

* cited by examiner

US 9,791,942 B2

DYNAMIC COLLABORATIVE ADJUSTABLE KEYBOARD

BACKGROUND

Many devices offer keyboards that can adjust their mappings based on the particular usage context. For example, one mapping may be used when a user is to enter an email address, while a different mapping is used when the user is to enter a phone number. However, when two or more people are conversing during a collaborative session, the keyboard settings do not account for the topics being discussed in applying keyboard mappings. The mappings used are typically pre-set and cannot be easily changed if at all.

SUMMARY

According to one embodiment of the present invention, a method for dynamically adjusting a keyboard mapping detects a collaborative session in which a participant device is involved. One or more topics being discussed during the collaborative session is identified, and a keyboard mapping corresponding to the one or more identified topics is determined. A keyboard using the keyboard mapping is displayed on the participant device.

In one aspect of the present invention, in identifying the one or more topics being discussed during the collaborative session comprises, a conversation between two or more participants during the collaborative session is captured, and the one or more topics being discussed during the conversation is identified using textual analysis.

In one aspect of the present invention, in determining the keyboard mapping corresponding to the one or more identified topics, the one or more identified topics is compared with a plurality of rules, where each of the plurality of rules associates a given topic with a given keyboard mapping. One or more given rules of the plurality of rules are determined to comprise the given topic matching the one or more identified topics, and the given keyboard mapping associated with the given topic is obtained.

In one aspect of the present invention, a history of rules applied in prior collaborative session where topics that are same or similar to the identified topics were discussed, or a profile of a participant using the participant device is further considered in determining the given rule.

In one aspect of the present invention, the keyboard mapping is displayed on a display coupled to the participant device with a request for an acceptance or a rejection of the keyboard mapping. When the acceptance is received, the keyboard using the keyboard mapping is displayed on the participant device. When the rejection is received, the keyboard using the keyboard mapping is not displayed on the participant device.

System and computer program products corresponding to the above-summarized methods are also described and claimed herein.

DETAILED DESCRIPTION

Figure 1:
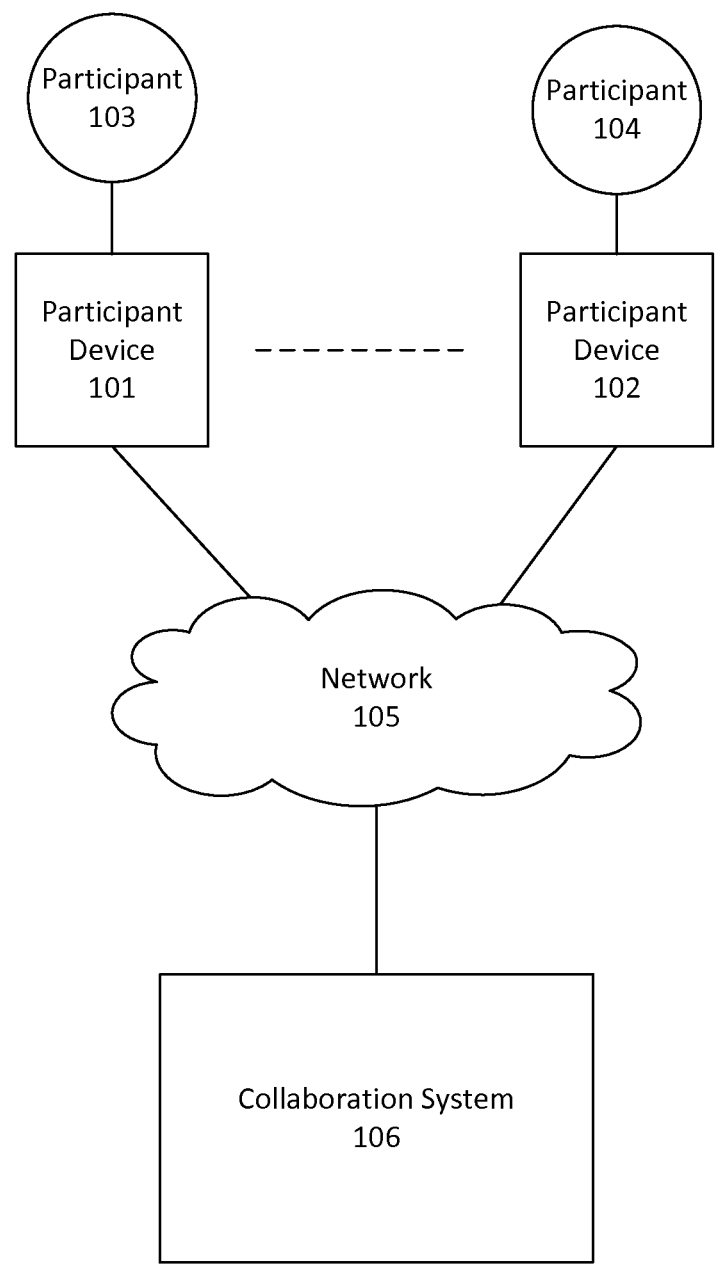
FIG. 1 illustrates a system for dynamically adjusting the keyboard mapping according to embodiments of the present invention.

Embodiments of the present invention dynamically adjust the keyboard mapping at one or more participant devices during a collaborative session. FIG. 1 illustrates a system for dynamically adjusting the keyboard mapping according to embodiments of the present invention. The system includes two or more participant devices 101-102, through which two or more participants 103-104 may collaborate using a collaboration system 106 over a communications network 105. For example, the participant device(s) 101-102 may be mobile devices, such as mobile phones or tablets. A datastore (not shown) may be coupled to each participant device 101-102 or to the collaboration system 106 to store a plurality of rules that associate topics with keyboard mappings. The collaboration system 106 may provide video or audio conferencing, instant messaging, chat, texting, or email services. The collaboration system 106 may further comprise a social platform of various types.

Figure 2:
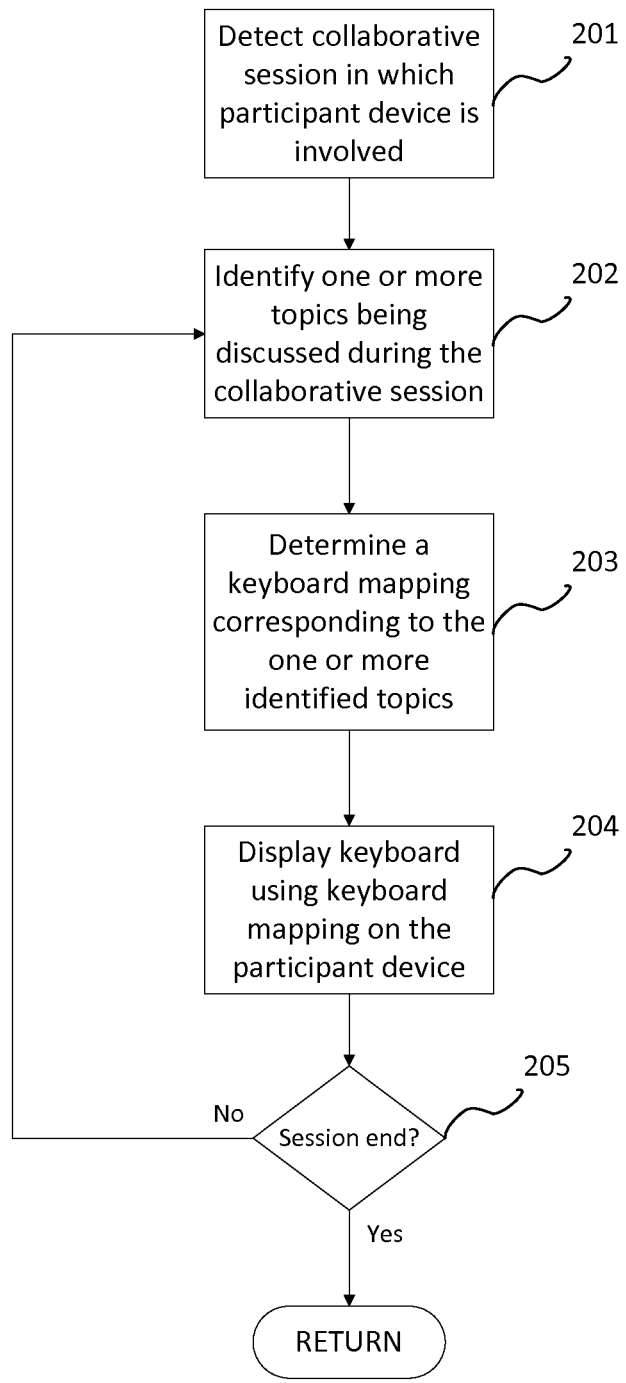
FIG. 2 illustrates a method for dynamically adjusting the keyboard mapping according to embodiments of the present invention.

FIG. 2 illustrates a method for dynamically adjusting the keyboard mapping according to embodiments of the present invention. Embodiments of the method may be implemented at each participant device 101-102 or for each participant device 101-102 by the collaboration system 106. The method first detects a collaborative session in which a participant device 101 is involved (201). Once detected, the method captures the conversation or exchange between the participants 103-104 of the collaborative session. Using textual analysis, and voice recognition techniques if natural language is involved, the method identifies one or more topics being discussed during the collaborative session (202). Any textual analysis technique appropriate for the particular collaboration format may be used, such as the use of ontology systems. The method determines a keyboard mapping corresponding to the one or more topics for the participant device 101 (203). The keyboard mapping maps one or more symbols relevant to the identified topics with keys on the keyboard. The method then displays a keyboard using the keyboard mapping on the participant device 101 (204). Steps 202-204 are performed while the collaborative session is occurring and may be repeated periodically until the collaborative session ends (205). In this manner, as the topics discussed change, the keyboard mappings may also change.

In identifying the one or more topics, the method compares the topics identified with the topics stored in a plurality of rules stored in a datastore. As described above, the plurality of rules associate topics with keyboard mappings. When a match is found, the method obtains the keyboard mapping associated with the matching topic. The association rules may be preset or participant-defined, and the mappings in the rules may further be modified by the participant 103. Prior to applying the keyboard mapping, the keyboard mapping may be displayed on a display coupled to the participant device 101 with a request for the participant 103 to either accept or reject the keyboard mapping. If an acceptance is received, then the keyboard mapping is applied, and the keyboard is displayed on the participant device 101 using the keyboard mapping. If a rejection is received, then the keyboard mapping is not applied, and the keyboard is not displayed with the keyboard mapping. Additional parameters may also be used to determine a "match" with a specific rule. One such parameter may be a history of rules applied in prior collaborative sessions where the same or similar topics were discussed. A rule that has previously been applied would be considered a stronger "match" than other rules. Another such parameter may be the given participant's profile. For example, a keyboard mapping relevant to a technical topic may be considered a stronger match for a participant who works in the engineering group than for a participant who works in the marketing group. Another such parameter may be user-defined priorities, where a participant can define which mappings are preferred. Other parameters are possible without departing from the spirit and scope of the present invention. These parameters may also be used to select a rule when multiple topics are identified as being discussed to which multiple rules match. Further, by applying the additional parameters, different rules and mapping may be applied at different participant devices 101-102 of the same collaborative session.

For illustrative purposes, assume that four participant devices are involved in a telephone conference. Each participant in the collaborative session starts with a display of a keyboard with a default keyboard mapping. During the telephone conference, a chat session is shared among the participants. As new content is being added to the chat area by a first participant at a first participant device, the topic being discussed is identified, and the keyboard mapping corresponding to the topic is determined. The keyboard at a second participant device is then changed to display this keyboard mapping. For example, if the topic being discussed is about money, then symbols such as '$', '%', '£', or '€' may be part of the keyboard mapping used. If the topic then changes to mathematical formulas, then symbols such as '≤', 'Δ', 'Σ', or '≠' may be part of the keyboard mapping used.

Figure 3:
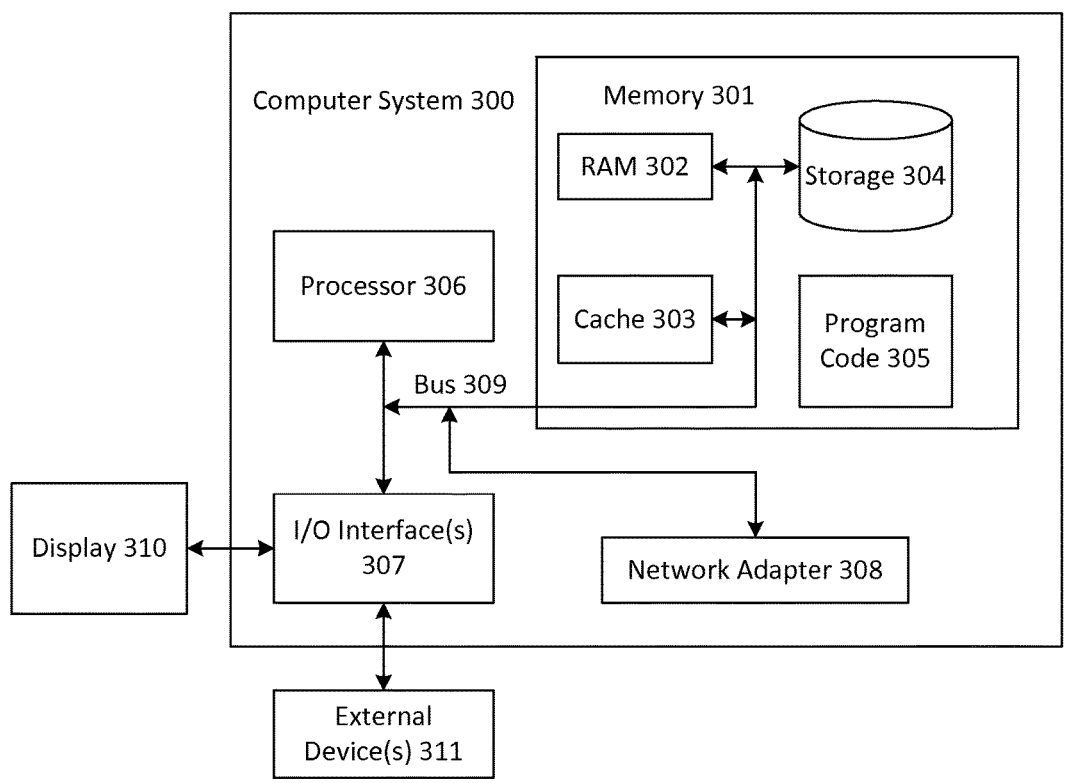
FIG. 3 illustrates a computer system according to embodiments of the present invention.

The method may be implemented at one or more of the participant devices 101-102 or by the collaboration system 106 which sends the keyboard mapping corresponding to the identified topic(s) to the participant device 101. At the participant device 101, the method may be implemented as an application, as a function of the operating system, and/or by a web browser. The participant devices 101-102 and the collaboration system 106 may each be a computer system as illustrated in FIG. 3. The computer system 300 is operationally coupled to a processor or processing units 306, a memory 301, and a bus 309 that couples various system components, including the memory 301 to the processor 306. The bus 309 represents one or more of any of several types of bus structure, including a memory bus or memory controller, a peripheral bus, an accelerated graphics port, and a processor or local bus using any of a variety of bus architectures. The memory 301 may include computer readable media in the form of volatile memory, such as random access memory (RAM) 302 or cache memory 303, or non-volatile storage media 304. The memory 301 may include at least one program product having a set of at least one program code module 305 that are configured to carry out the functions of embodiments of the present invention when executed by the processor 306. The computer system 300 may also communicate with one or more external devices 311, such as a display 310, via I/O interfaces 307. The computer system 300 may communicate with one or more networks via network adapter 308.

In the above manner, embodiments of the present invention dynamically adjust the keyboard mapping at one or more participant devices during a collaborative session, allowing easier access to relevant keys at participant devices' keyboards for a focused and context-specific response.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention has been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for dynamically adjusting a keyboard mapping, implemented by a processor, comprising:
    detecting a collaborative session in which a first participant at a first participant device and a second participant at a second participant device are involved;
    identifying one or more topics being discussed during the collaborative session from a plurality of topics;
    comparing, using a set of parameters including a user-defined priority of a respective participant, the one or more identified topics with topics stored in a plurality of rules, each of the plurality of rules associating a given topic with a given keyboard mapping;
    determining using the set of parameters, that one or more given rules of the plurality of rules comprise the given topic matching the one or more identified topics;
    obtaining the given keyboard mapping associated with the given topic that maps each of one or more individual symbols relevant to the given topic with a respective key on a keyboard; and
    displaying the keyboard, on a respective participant device using the given keyboard mapping.

2. The method of claim 1, wherein the identifying of the one or more topics being discussed during the collaborative session comprises:
    capturing a conversation between two or more participants during the collaborative session; and
    identifying the one or more topics being discussed during the conversation from the plurality of topics including a math topic and a finance topic, each having a unique symbol set, using textual analysis.

3. The method of claim 1, wherein in determining the one or more given rules of the plurality of rules comprise the given topic matching the one or more identified topics, further considering a parameter in the set of parameters of a history of rules applied in prior collaborative session where topics that are same as or similar to the one or more identified topics were discussed, and wherein a rule that has previously been applied is considered a stronger match than other rules.

4. The method of claim 1, wherein the determining the one or more given rules of the plurality of rules comprise the given topic matching the one or more identified topics, further considering a parameter in the set of parameters of a profile of the respective participant using the respective participant device.

5. The method of claim 1, wherein one or more of the plurality of rules are selected from a group consisting of preset rules and participant-defined rules, and wherein mappings in the one or more of the plurality of rules are modified by one or more respective participants of the collaborative session.

6. The method of claim 1, wherein the displaying of the keyboard using the given keyboard mapping on the respective participant device comprises:
    displaying the given keyboard mapping on a display coupled to the respective participant device, prior to applying the given keyboard mapping, with a request for an acceptance of the given keyboard mapping;
    when the acceptance is received, applying the given keyboard mapping using the given keyboard mapping on the respective participant device; and when a rejection is received, not applying the given keyboard mapping and not displaying the keyboard using the given keyboard mapping on the respective participant device.

7. A computer program product for dynamically adjusting a keyboard mapping, the computer program product comprising a computer readable storage medium having program instructions embodied therewith, the program instructions executable by a processor to cause the processor to perform a method comprising:
   detecting a collaborative session in which a first participant at a first participant device and a second participant at a second participant device are involved;
   identifying one or more topics being discussed during the collaborative session from a plurality of topics;
   comparing, using a set of parameters including a user-defined priority of a respective participant, the one or more identified topics with topics stored in a plurality of rules, each of the plurality of rules associating a given topic with a given keyboard mapping;
   determining using the set of parameters, that one or more given rules of the plurality of rules comprise the given topic matching the one or more identified topics;
   obtaining the given keyboard mapping associated with the given topic for the respective participant that maps each of one or more individual symbols relevant to the given topic with a respective key on a keyboard; and
   displaying the keyboard on a respective participant device using the given keyboard mapping.

8. The computer program product of claim 7, wherein the identifying of the one or more topics being discussed during the collaborative session comprises:
   capturing a conversation between two or more participants during the collaborative session; and
   identifying the one or more topics being discussed during the conversation from the plurality of topics including a math topic and a finance topic, each having a unique symbol set, using textual analysis.

9. The computer program product of claim 7, wherein the determining the one or more given rules of the plurality of rules comprise the given topic matching the one or more identified topics, further considering a parameter in the set of parameters of a history of rules applied in prior collaborative session where topics that are same as or similar to the one or more identified topics were discussed, and wherein a rule that has previously been applied is considered a stronger match than other rules.

10. The computer program product of claim 7, wherein in determining the one or more given rules of the plurality of rules comprise the given topic matching the one or more identified topics, further considering a parameter in the set of parameters of a profile of the respective participant using the respective participant device.

11. The computer program product of claim 7, wherein one or more of the plurality of rules are selected from a group consisting of preset rules and participant-defined rules, and wherein mappings in the one or more of the plurality of rules are modified by one or more participants of the collaborative session.

12. The computer program product of claim 7, wherein the displaying of the keyboard using the given keyboard mapping on the respective participant device comprises:
   displaying the given keyboard mapping on a display coupled to the respective participant device prior to applying the given keyboard mapping, with a request for an acceptance of the given keyboard mapping;
   when the acceptance is received, applying the given keyboard mapping using the given keyboard mapping on the respective participant device; and
   when a rejection is received, not applying the given keyboard mapping and not displaying the keyboard using the given keyboard mapping on the respective participant device.

13. A system, comprising:
   a processor; and
   a computer readable storage medium having program instructions embodied therewith, the program instructions, executable by the processor, to cause the processor to perform a method comprising:
   detecting, by the processor, a collaborative session in which a first participant at a first participant device and a second participant at a second participant device is involved;
   identifying, by the processor, one or more topics being discussed during the collaborative session from a plurality of topics;
   comparing, by the processor using a set of parameters including a user-defined priority of a respective participant, the one or more identified topics with topics stored in a plurality of rules, each of the plurality of rules associating a given topic with a given keyboard mapping;
   determining, by the processor using the set of parameters, that one or more given rules of the plurality of rules comprise the given topic matching the one or more identified topics;
   obtaining, by the processor, the given keyboard mapping associated with the given topic for the respective participant that maps each of one or more individual symbols relevant to the given topic with a respective key on a keyboard; and
   displaying, by the processor, the keyboard on a respective participant device using the given keyboard mapping.

14. The system of claim 13, wherein the determining the one or more given rules of the plurality of rules comprise the given topic matching the one or more identified topics, further considering, by the processor, a parameter in the set of parameters of a history of rules applied in prior collaborative session where topics that are same as or similar to the one or more identified topics were discussed, and wherein a rule that has previously been applied is considered a stronger match than other rules.

15. The system of claim 13, wherein in determining the one or more given rules of the plurality of rules comprise the given topic matching the one or more identified topics, further considering, by the processor, a parameter in the set of parameters of a profile of the respective participant using the respective participant device.

16. The system of claim 13, wherein one or more of the plurality of rules are selected by the processor from a group consisting of preset rules and participant-defined rules, and wherein mappings in the one or more of the plurality of rules are modified by one or more participants of the collaborative session.

17. The system of claim 13, wherein the displaying of the keyboard, by the processor using the given keyboard mapping on the respective participant device comprises:
   displaying, by the processor the given keyboard mapping on a display coupled to the respective participant device prior to applying the given keyboard mapping with a request for an acceptance or a rejection of the given keyboard mapping;

when the acceptance is received, by the processor, applying, by the processor the given keyboard mapping using the given keyboard mapping on the respective participant device; and when a rejection is received by the processor, not applying the given keyboard mapping, by the processor and not displaying, by the processor, the keyboard using the given keyboard mapping on the respective participant device.

\* \* \* \* \*